UNITED STATES PATENT OFFICE.

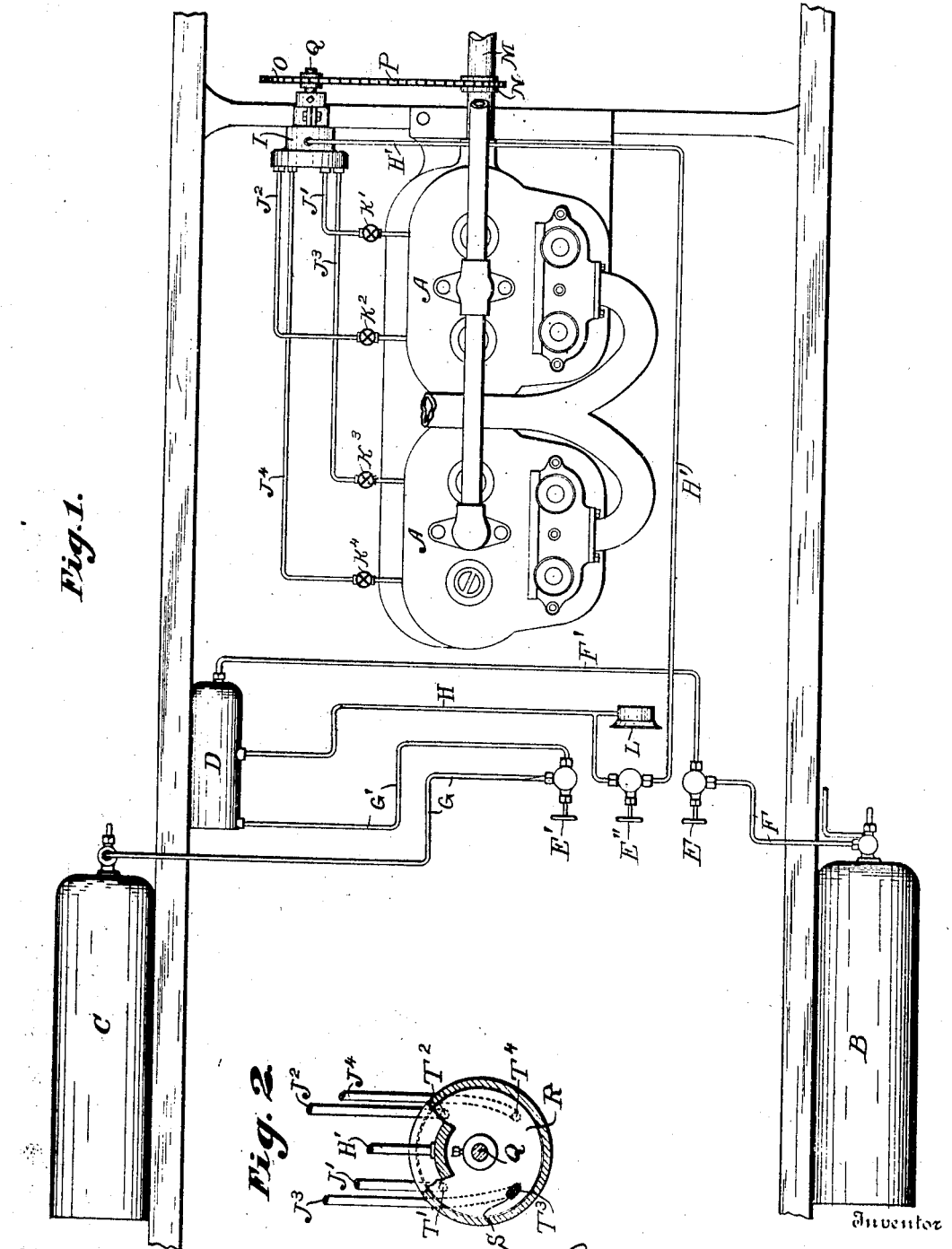

GEORGE L. ODENBRETT, OF MILWAUKEE, WISCONSIN.

ENGINE-STARTER.

No. 892,544.　　　　Specification of Letters Patent.　　　Patented July 7, 1908.

Application filed October 5, 1907. Serial No. 396,105.

*To all whom it may concern:*

Be it known that I, GEORGE L. ODENBRETT, residing in Milwaukee, in the county of Milwaukee and State of Wisconsin, have invented new and useful Improvements in Engine-Starters, of which the following is a description, reference being had to the accompanying drawings, which are a part of this specification.
This invention has for its object to provide automatic means for starting multiple cylinder gas engines and the like, especially when used for automobile purposes, and comprises a selecting valve driven by the engine for establishing communication between a source of charge supply under pressure and that cylinder of the engine in which the piston is in proper position to receive an explosion, whereby an explosion may be produced in said cylinder by starting the igniting mechanism and thus the engine is started without the necessity for turning the crank shaft by hand.

A further object of the invention is to improve upon details of construction of such engine starting devices.

With the above and other objects in view, the invention consists in the engine starter herein claimed, its parts and combinations of parts and all equivalents.

Referring to the accompanying drawing in which like characters of reference indicate the same parts in the different views, Figure 1 is a plan view of an engine starter constructed in accordance with this invention and mounted on an automobile frame; and, Fig. 2 is a detail sectional view of the selecting valve thereof, the pipe connections having a somewhat different arrangement than as shown in Fig. 1, for clearness of illustration.

In these drawings, A, A represent a multiple cylinder engine, as here shown there being four cylinders in all, arranged vertically at the front or boot of the automobile frame as usual, and B and C are acetylene or other gas and air reservoirs respectively, secured to the sides of the automobile frame, D being a charging tank in any desirable location and likewise secured to the frame. A series of three hand valves E, E' and E'' are provided within convenient reach of the driver, preferably on the dash-board. The valve E controls communication between a pipe F leading from the gas tank B and a pipe F' leading to the charging tank D. The valve E' controls communication between a pipe G leading from the air reservoir C and a pipe G' leading to the charging tank D. The valve E'' controls communication between a pipe H leading from the charging tank D and a pipe H' leading to a selecting valve I which is desirably secured at the front part of the automobile frame as shown. The selecting valve I has pipes $J^1$, $J^2$, $J^3$ and $J^4$ leading therefrom at different positions on its disk-shaped head to the explosion chambers of the respective cylinders of the engine, these pipes being provided with check valves $K^1$, $K^2$, $K^3$ and $K^4$, arranged to prevent a flow therethrough from the cylinder toward the selecting valve. The pipe H contains a pressure gage L which is also desirably located on the dash-board and which will indicate to the driver the degree of pressure contained within the charging tank D.

The crank-shaft M of the engine has a pinion N thereon which is geared to a sprocket wheel O by means of a chain P, said sprocket wheel O being mounted on a shaft Q which is journaled in the casing of the selecting valve I with a disk-shaped valve member R rigidly but adjustably secured thereon. The disk valve R is thus rotated by the engine at a speed which will cause it to make one revolution with each two revolutions of the crank-shaft, the pinion N and the sprocket O being so proportioned, and serves to control communication between the pipe H', which connects with the space on one side thereof, and the pipes $J^1$, $J^2$, $J^3$ and $J^4$, which connect with the casing on the other side thereof, by means of an elongated opening S therein being brought into register with the mouths of these pipes in succession. The disk valve R is so positioned on the shaft Q that the opening S will always register with that pipe which leads to the engine cylinder in which the piston is in position to receive an explosion, and the fit of the disk valve within the casing is sufficiently close to prevent communication between the pipe H' and any of the pipes with which the opening S is not in register.

In operation, when the engine has been standing idle for some time, as upon starting out in the morning, or whenever it is impossible to start its operation by the igniting of a charge stored in the proper cylinder, the usual cranking is dispensed with by this invention and it is started by first opening valve E to allow acetylene or other gas stored in reservoir B to pass to the charging tank D until a desired pressure in the charging tank is indicated by the pressure gage L, the other valves E' and E'' being closed. E'' is opened to permit the gas in the charging tank D to travel through the pipes H and H' to the selecting valve I, where it will pass through one of the pipes J¹, J², J³, or J⁴, according to the position of the opening S in the disk valve R, to that cylinder whose piston is in position to receive an explosion, and then by starting the igniting mechanism, the gas will be exploded as soon as it forms a proper mixture with the air found by it in the cylinder, thus starting the engine in its operation. If the engine does not start on admitting the gas alone, valve E'' is left open and valve E' is opened to admit compressed air to the charging tank D, which drives the gas ahead of it into the proper cylinder, and when forming the proper mixture therewith in the cylinder the explosion will take place to start the engine.

Ordinarily it will not be necessary to use the compressed air in starting, as the cylinder of the engine with which connection is made by the selecting valve I will naturally contain a quantity of air and it will be found sufficient to merely admit the acetylene gas by opening valves E and E'', and relying upon the gas so admitted mixing with the air in such cylinder, the igniting mechanism in the meantime being in operation so that when the proper mixture is formed the explosion will take place. Thus the air reservoir and charging tank with other parts may be dispensed with if desired, but they are preferably employed in the manner stated. With multiple cylinder engines having six or more cylinders, so that there is no dead center, the compressed air only may be employed. It then is delivered to the proper cylinder by means of the selecting valve and alone acts upon the piston with the pressure in reservoir C and serves to operate the engine as an air motor until the engine is in condition to be operated by an explosive charge. It is therefore possible to employ the air reservoir without the gas reservoir and charging tank, but as before stated the combination of these is preferred.

By means of this invention the inconvenience of starting the engine by a hand crank is entirely avoided and the selecting valve serves to automatically admit the starting charge or the air pressure to the proper cylinder. The check valves in the pipes leading to the cylinders prevent back pressure from the cylinders finding its way to the selecting valve and the starting system remains in operative condition at all times.

What I claim as new and desire to secure by Letters Patent is:

1. A starter for multiple cylinder engines, comprising a selecting valve driven by the engine and adapted to establish communication with the respective cylinders of the engine when their pistons are in position to receive an explosion, a charging chamber communicating with the selecting valve, an air reservoir and a gas reservoir communicating with the charging chamber, and controlling valves in the connections between the charging chamber and the air reservoir and the gas reservoir and the selecting valve respectively.

2. A starter for multiple cylinder engines comprising a selecting valve driven by the engine and adapted to establish communication with the respective cylinders of the engine when their pistons are in position to receive an explosion, a charging chamber communicating with the selecting valve, an air reservoir and a gas reservoir communicating with the charging chamber, hand controlled valves in the connections between the charging chamber and the selecting valve and the air reservoir and the gas reservoir respectively, a pressure gage connected with the charging chamber, and check valves in the communications between the selecting valve and the cylinders of the engine.

3. In combination with a multiple cylinder automobile engine, a selecting valve driven by the engine and adapted to establish communication with the respective cylinders thereof when their pistons are in position to receive an explosion, a charging chamber, a pipe connection including a hand controlled valve and a pressure gage between the charging chamber and the selecting valve, air and gas reservoirs, and pipe connections between said reservoirs and the charging chamber each containing a hand controlled valve, said hand controlled valves and pressure gage being grouped together in a position where they will be easily accessible to the driver.

In testimony whereof, I affix my signature, in presence of two witnesses.

GEORGE L. ODENBRETT.

Witnesses:
ALMA A. KLUG,
ANNA F. SCHMIDTBAUER.